United States Patent
Väisänen

(10) Patent No.: US 6,963,735 B2
(45) Date of Patent: Nov. 8, 2005

(54) METHOD AND ARRANGEMENT FOR RECEIVING A FREQUENCY MODULATED SIGNAL

(75) Inventor: Risto Väisänen, Salo (FI)

(73) Assignee: Nokia Mobile Phones Ltd., Espoo (FI)

(*) Notice: Subject to any disclaimer, the term of this patent is extended or adjusted under 35 U.S.C. 154(b) by 571 days.

(21) Appl. No.: 09/843,014

(22) Filed: Apr. 26, 2001

(65) Prior Publication Data

US 2001/0044291 A1 Nov. 22, 2001

(30) Foreign Application Priority Data

Apr. 27, 2000 (FI) .............................................. 20001000

(51) Int. Cl.⁷ .............................................. H04B 15/00
(52) U.S. Cl. .................... 455/313; 455/207; 455/276.1; 455/324; 375/324; 375/334; 327/116; 327/47
(58) Field of Search ................................ 455/313, 207, 455/276.1, 324; 375/324, 334; 327/116, 47

(56) References Cited

U.S. PATENT DOCUMENTS

| | | | | |
|---|---|---|---|---|
| 4,504,792 A | | 3/1985 | Furihata | 329/106 |
| 4,614,912 A | | 9/1986 | Moberg | 329/110 |
| 4,864,643 A | * | 9/1989 | French et al. | 455/302 |
| 4,910,467 A | * | 3/1990 | Leitch | 329/306 |
| 4,944,025 A | * | 7/1990 | Gehring et al. | 455/207 |
| 5,381,446 A | * | 1/1995 | McIntosh | 375/150 |
| 5,436,931 A | * | 7/1995 | Minami | 375/334 |
| 5,446,762 A | * | 8/1995 | Ohba et al. | 375/324 |
| 5,678,222 A | * | 10/1997 | Hornak et al. | 379/93.26 |
| 5,850,161 A | | 12/1998 | Rhie | 329/336 |
| 5,887,247 A | * | 3/1999 | Baltus et al. | 455/277.2 |
| 5,920,214 A | * | 7/1999 | Lee et al. | 327/147 |
| 6,035,186 A | * | 3/2000 | Moore et al. | 455/313 |
| 6,046,628 A | * | 4/2000 | Sasaki | 329/300 |
| 6,198,317 B1 | * | 3/2001 | Chow et al. | 327/116 |

FOREIGN PATENT DOCUMENTS

| | | | |
|---|---|---|---|
| EP | 0417528 | 3/1991 | |
| EP | 417528 A2 * | 3/1991 | .......... H04L/27/14 |
| EP | 0797292 A1 | 9/1997 | |

* cited by examiner

*Primary Examiner*—Sonny Trinh
*Assistant Examiner*—Huy Phan
(74) *Attorney, Agent, or Firm*—Perman & Green, LLP

(57) ABSTRACT

A method and arrangement for receiving a frequency modulated signal, includes mixing the frequency modulated signal into a low-frequency signal, detecting the falling and rising edges of said low-frequency signal and forming a second signal on the basis of the edge detection, where the frequency of the second signal is twice the frequency of the low-frequency signal, and frequency detecting the second signal to form a demodulated signal.

13 Claims, 6 Drawing Sheets

METHOD AND ARRANGEMENT FOR RECEIVING A FREQUENCY MODULATED SIGNAL

TECHNICAL FIELD OF THE INVENTION

The invention relates to a method and arrangement for receiving a frequency modulated signal, and especially for demodulating the signal. The invention is applicable especially in the receiver of a mobile station.

BACKGROUND ART OF THE INVENTION

Superheterodyne receivers are already known from the prior art. When the superheterodyne technique is used, the radio frequency signal to be received is mixed to a lower frequency by using one or more intermediate frequencies, which are essentially higher than the baseband. However, the heterodyne technique requires more complicated receivers, in which the manufacturing costs are higher than in the direct conversion technique, which is becoming more common today. In addition, power consumption is much higher in a heterodyne receiver than in a receiver implemented with the direct conversion technique. The direct conversion technique or zero intermediate frequency technique means using one frequency mixing for converting the modulated signal to be received into I/Q signals at a sufficiently low frequency, so that low pass filters can be used in channel filtering and that a separate new frequency mixing is not needed.

It would be possible to implement a direct conversion receiver by using a low intermediate frequency, the rate of which would be half of the channel spacing of the data transfer system. In that case, the mixer could be of the type that attenuates the image frequency, whereby the image frequency attenuation needed on the neighbouring channel (e.g. 26 dB) could be reached. To the best knowledge of the applicant, such a solution has not been disclosed in public.

FIG. 1 shows a block diagram of a known image frequency attenuating mixer for the reception of a frequency modulated signal. The signal to be received with an antenna 1 is filtered with a band-pass filter 2 and amplified with an amplifier 3. The signal of a local oscillator LO is phase-shifted 90° in block 4 and mixed with the upper branch of the amplified signal in a mixer 5. The mixing result is then phase-shifted 90° in block 6. The signal of the local oscillator LO is applied in the same phase (0° block 7) to a mixer 8, in which it is mixed with the lower branch of the amplified signal. The mixing result of the lower branch is then applied in the same phase (0° in block 9) to an adder 10, in which the signals formed as the mixing result are added together 10 into an intermediate frequency signal IF.

If the intermediate frequency is half of the channel spacing, it could be, for instance, 15 kHz. However, this is too low a frequency to enable an ordinary FM detector to operate as a demodulator with ordinary deviations, such as 8 kHz. In addition, the conventional LC detector based on a coil and a capacitor cannot be used, because the inductance value of the coil and the capacitance value of the capacitor should be very high. In addition, FM detectors that operate with the pulse counter principle are known, but even in such a detector, a low intermediate frequency causes a substantial distortion of the detected signal.

SUMMARY OF THE INVENTION

It is an objective of the invention to provide a simpler and more efficient solution compared to the prior art for receiving a frequency modulated signal, by means of which a good quality of the detected signal can be achieved.

One idea of the invention is to convert a radio frequency, frequency modulated signal directly into a low-frequency signal, and to perform demodulation by forming by means of the falling and rising edges of the low-frequency signal a second signal, which has a frequency rate twice the frequency of the low-frequency signal, and by frequency detecting the second signal.

The method according to the invention for receiving a frequency modulated signal is characterized in that the radio frequency signal is mixed into a low-frequency signal, the falling and rising edges of the low-frequency, modulated signal are detected, a second signal is formed on the basis of the edge detection, the frequency of the second signal being twice the frequency of the low-frequency signal, and the second signal is frequency modulated to form a demodulated signal.

The arrangement according to the invention for receiving a frequency modulated signal is characterized in that it comprises means for mixing a radio frequency signal into a low-frequency signal, and demodulator means, which comprise means for detecting the falling and rising edges of the low-frequency signal, means for forming a second signal on the basis of the edge detection, the frequency of the second signal being twice the frequency of the low-frequency signal, and means for the frequency detection of the second signal.

Preferred embodiments of the invention are set forth in the dependent claims.

By means of the invention, the advantages of the direct conversion technique, such as low power consumption, are achieved in the reception of the frequency modulated signal. In addition, the costs of filters, synthesizers and semiconductors, for example, can be substantially reduced. The number of other discrete components can also be reduced. The required components can be advantageously manufactured on an integrated circuit. When implemented in accordance with the invention, the device also requires less space. Besides these advantages, a good quality of the detected signal is achieved. The advantages of the invention can be best utilized in mobile stations and other small, portable receivers, such as pagers.

BRIEF DESCRIPTION OF THE DRAWINGS

In the following, the invention will be described in more detail with reference to the accompanying drawings, in which.

DETAILED DESCRIPTION

Figure 1:
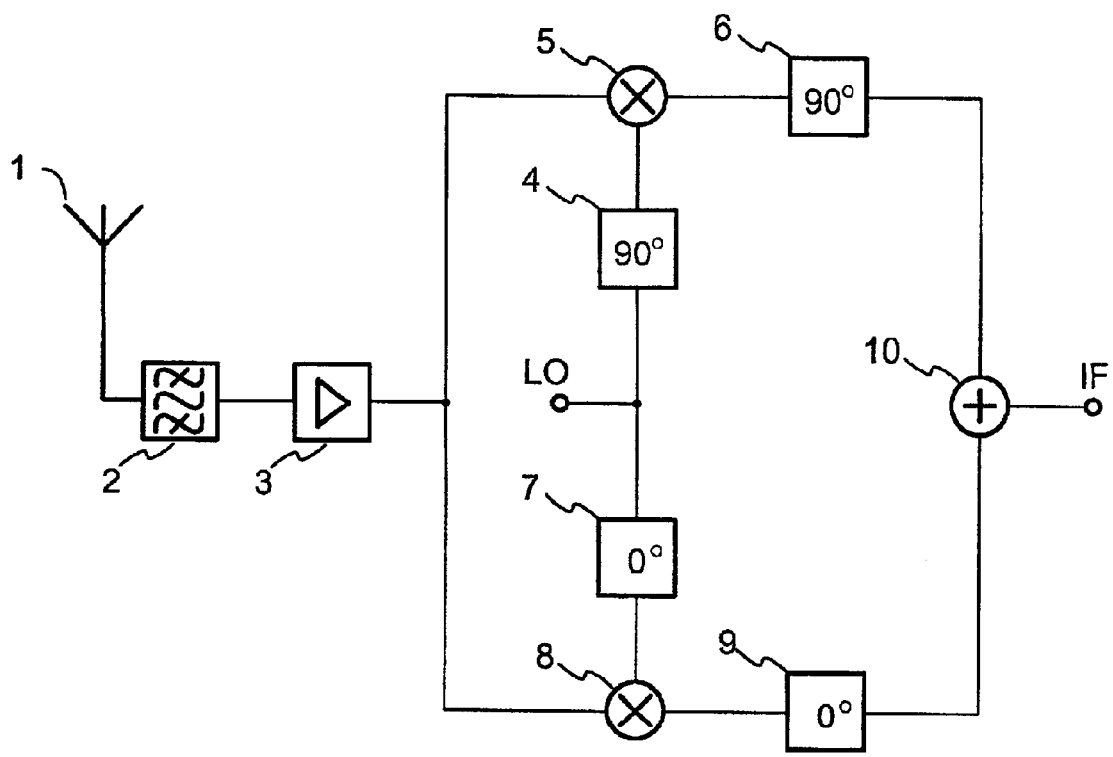
FIG. 1 shows a block diagram about the well-known general principle of an image frequency attenuating mixer.

FIG. 1 was discussed above in connection with the description of the prior art.

Figure 2:
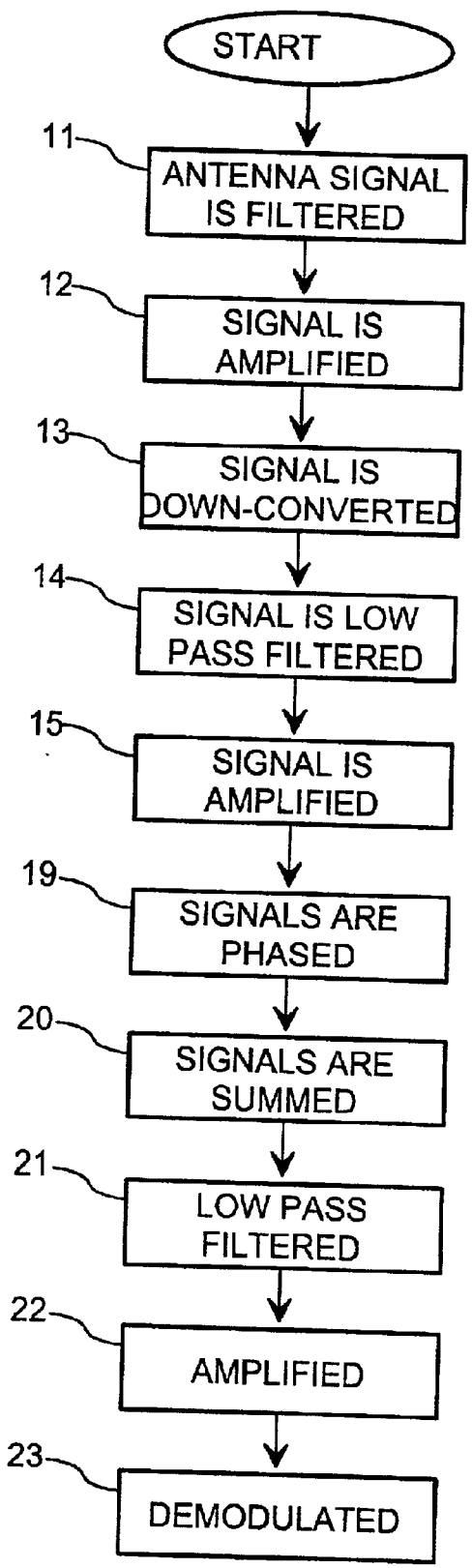
FIG. 2 shows a flow chart of a method according to the invention.

FIG. 2 shows a flow chart of a method according to the invention for receiving a frequency modulated signal. The signal received by an antenna is filtered 11 with a band pass filter and amplified 12. The amplified signal is down-converted 13 in two branches with 0° and 90° phase-shifted local oscillator signals respectively. The signals of both branches are low pass filtered 14 and amplified 15.

The frequency modulated signal is processed in accordance with the invention so that the signals are phased 19 in both branches by phase-shifting the signals 0° and 90° respectively. The phase-shifted signals are added 20 into one signal, which is low pass filtered 21, amplified 22 and demodulated 23. The result is a detected low-frequency signal.

Figure 3:
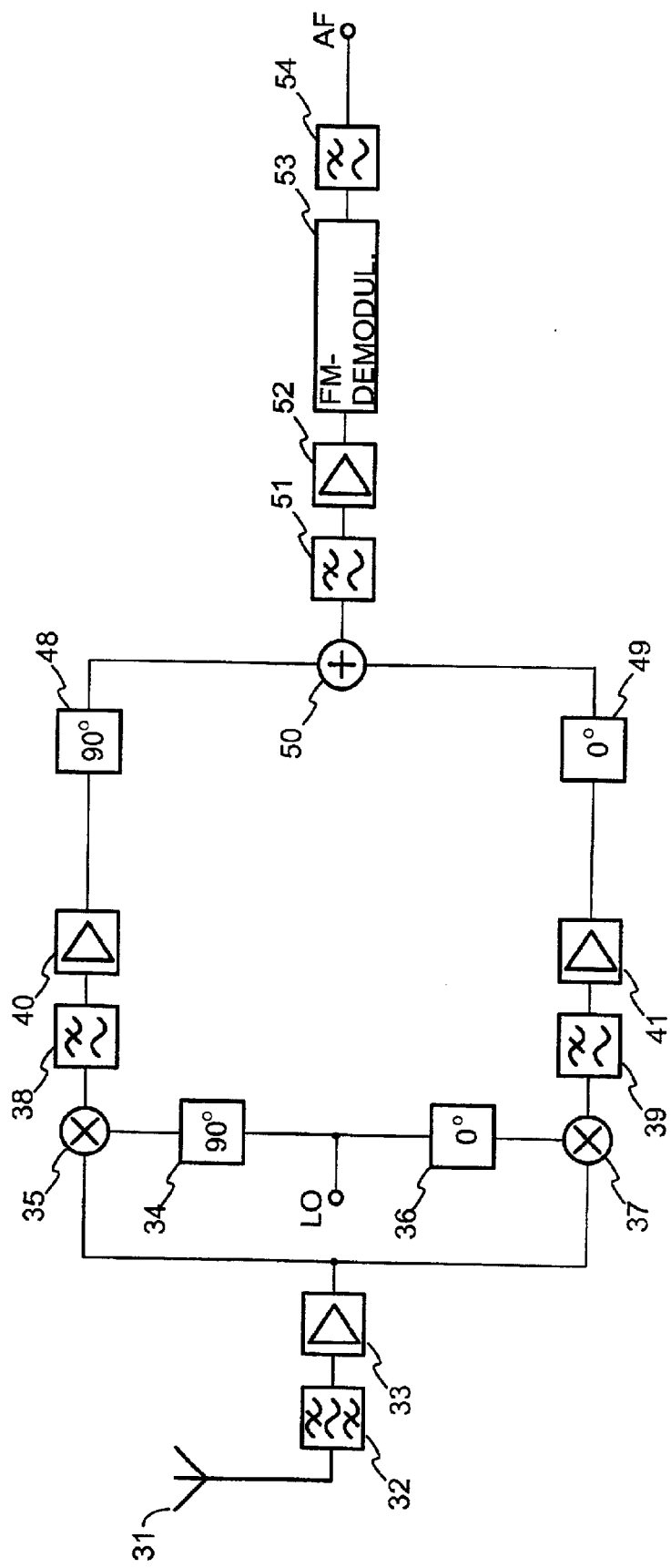
FIG. 3 shows a block diagram of an arrangement according to the invention.

FIG. 3 shows a block diagram of the parts of a receiver arrangement according to the invention, which are essential for the invention. The signal received by an antenna 31 is applied through a band pass filter 32 and an amplifier 33 to mixers 35, 37 in two branches. The signal of a local oscillator LO is applied in the same phase 36 to a mixer 37 and 90° phase-shifted 34 to a mixer 35. The signals of both branches are further applied to low pass filters 38, 39 and amplifiers 40, 41.

The output of the frequency modulated signal from the amplifier 40 is applied to a 90° phase-shifter 48 and to the first input of the adder 50. The frequency modulated signal derived from the amplifier 41 is applied in the same phase (0°) 49 to the second input of the adder 50. The sum signal is further applied through a low pass filter 51 and a limiter amplifier 52 to the demodulator 53 of a frequency modulated signal. The demodulated signal is low pass filtered with a filter 54, and an analogue low-frequency signal AF is obtained.

Figure 4A:
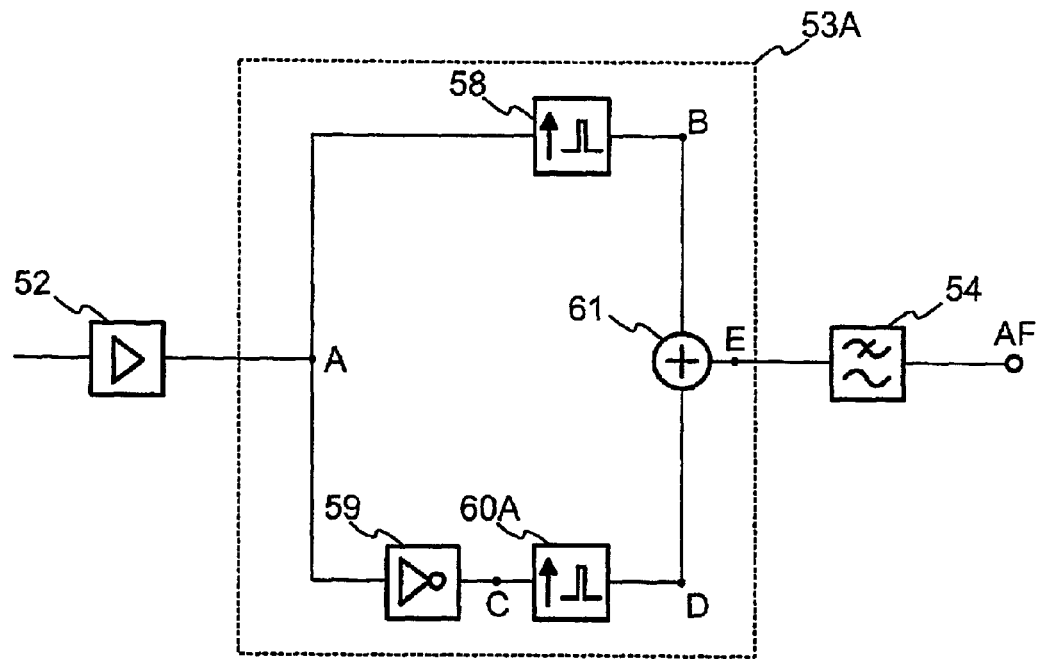
FIG. 4 shows block diagrams of some demodulators according to the invention.

FIG. 4A shows a block diagram, which includes, among other things, a demodulator 53A based on pulse detectors according to the invention. Block 53A, which is indicated by a dashed line, corresponds to the FM demodulator block 53 in FIG. 3. For the sake of graphical clarity, the block diagram also shows an amplifier 52 and a low pass filter 54. From the amplifier 52, the frequency modulated signal is coupled to point A of the demodulator 53A, from which the signal is branched into an upper and lower branch. In the upper branch, the signal is detected with a pulse detector 58 to point B. In the lower branch, the signal is inverted with an inverter 59 to point C and detected as inverted with a pulse detector 60, whereby a detection of the falling edges of the pulses of the signal of point A is obtained to point D. The pulse detectors 58, 60A form the rising signal edge into a pulse with a standard height and width but preferably shorter in time than the pulse of the signal to be detected. The rising and falling edges of the signal of point A detected to points B and D are added with an adder 61 to point E. The demodulation is finished with a low pass filter 54 to the output AF.

Figure 4B:
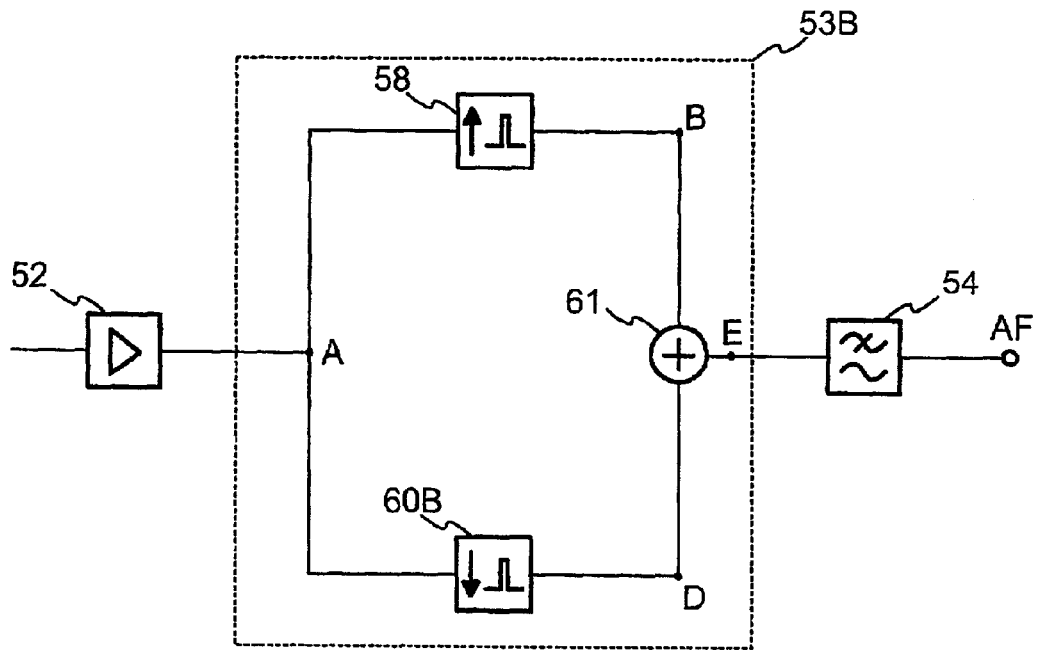

FIG. 4B shows another block diagram, which includes, among other things, another and more advantageous demodulator 53B based on pulse detectors according to the invention. Block 53B, which is indicated by a dashed line, corresponds to the FM demodulator block 53 in FIG. 3. For the sake of graphical clarity, this block diagram also shows an amplifier 52 and a low pass filter 54. From the amplifier 52, the frequency modulated signal is coupled to point A of the demodulator 53B, from which the signal is branched into an upper and lower branch. In the upper branch, the signal is detected with a pulse detector 58 to point B. In the lower branch, the signal is detected as such from its falling edge with a pulse detector 60B to point D. The pulse detector 58 of the upper branch forms the rising signal edge and the pulse detector 60B of the lower branch the falling signal edge into a pulse with a standard height and width but preferably shorter in time than the pulse of the signal to be detected. The rising and falling edges of the signal of point A detected to points B and D are added with an adder 61 to point E. The demodulation is finished with a low pass filter 54 to the output AF.

Figure 5:
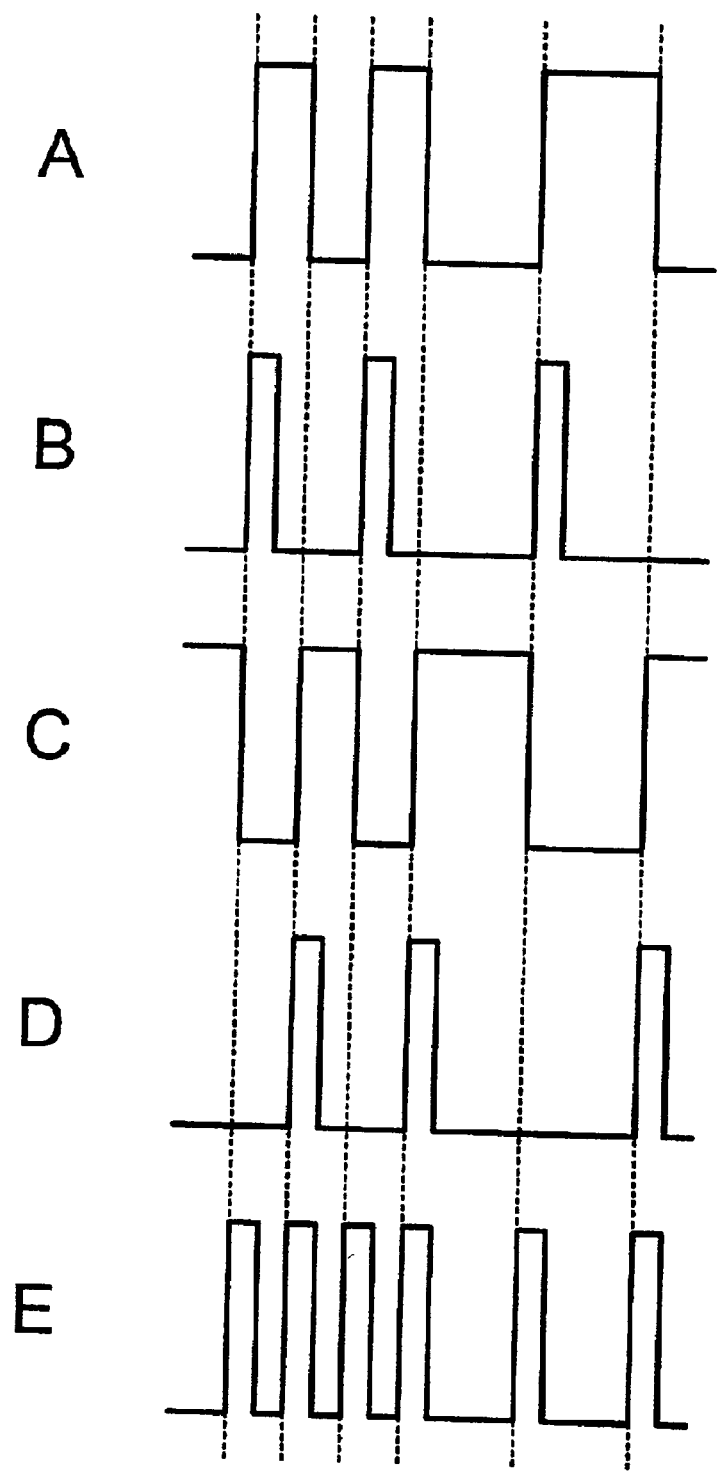
FIG. 5 shows a signal flow diagram of a demodulator according to FIG. 4.

FIG. 5 shows signal flow diagrams from the points A, B, C, D, E of a demodulator based on pulse detectors according to FIG. 4. Diagram A shows the signal fed to the demodulator at point A. Diagram B shows the result of the pulse detection of the upper branch at point B. Diagram C shows the inverted signal of the lower branch at point C, and diagram D shows the pulse detection of the inverted signal of the lower branch at point D. Diagram E shows the sum of the signals processed by the upper and lower branch at point E. The upper branch detects the rising edge of the signal fed to the demodulator and the lower branch as a whole detects the falling edge. The sum forms a signal detected as low pass filtered from the inputted frequency modulated signal.

Figure 6A:
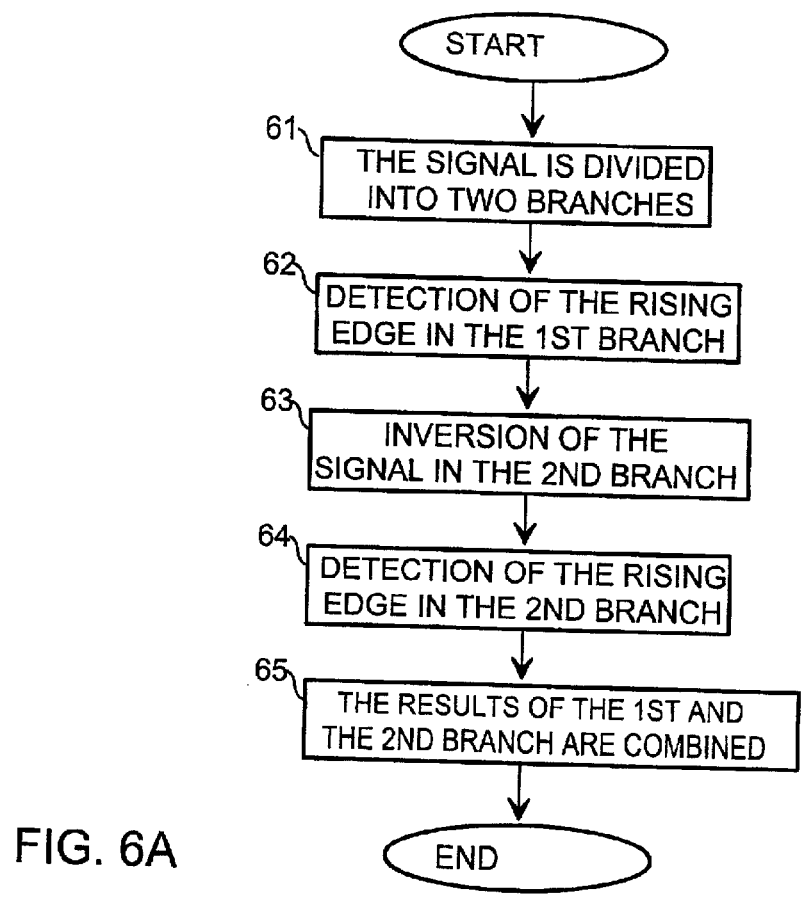
FIG. 6 shows a flow chart of the operation of demodulators according to FIG. 4.

FIG. 6A shows the operation of a demodulator according to FIG. 4A as a flow chart. The modulated signal is demodulated as follows: the modulated signal is divided 61 into two branches, to the first one for the detection of the rising signal edge and to the second one for the detection of the falling signal edge, the rising edge of the modulated signal is detected 62 in the first branch, the modulated signal is inverted 63 and the rising edge of the inverted modulated signal is detected in the second branch, and the signals processed in the first and the second branch are combined 65.

Figure 6B:
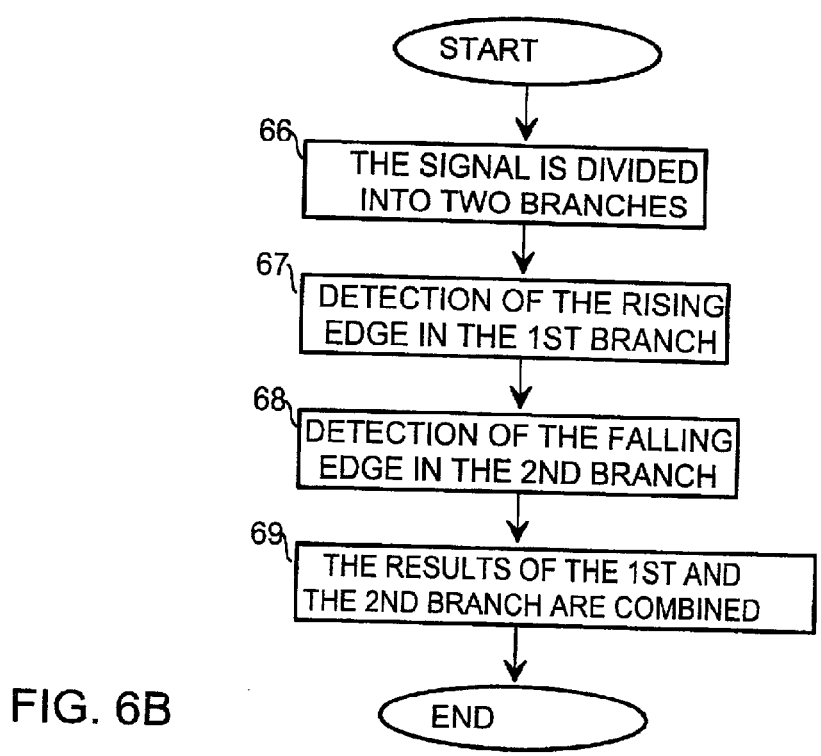

FIG. 6B shows the operation of a demodulator according to FIG. 4B as a flow chart. The modulated signal is demodulated as follows: the modulated signal is divided 66 into two branches, to the first one for the detection of the rising signal edge and to the second one for the detection of the falling signal edge, the rising edge of the modulated signal is detected 67 in the first branch, the falling edge of the modulated signal is detected 68 in the second branch, and the signals processed in the first and the second branch are combined 69.

The reception of an FM signal with a direct conversion receiver according to the invention according to FIGS. 3 and 6 is discussed in the following as an example. A FM radio signal is converted with the antenna 31 into an electric signal. The electric signal is filtered with a band pass filter 32 and amplified with an amplifier 33. the amplified signal is further processed in two branches with mixers 35, 37. The signal of a local oscillator LO is applied to the mixers 35, 37 with phase shifters 34, 36, which change the phase of the signal 90° and 0° respectively. The signals of both branches are then applied to low pass filters 38, 39 and further to amplifiers 40, 41.

According to this example, the frequency modulated signal is further processed in both branches with phase shifters 48, 49 (90° and 0°) and an adder 50. The sum signal is then applied through a low pass filter 51 and an amplifier 52 to the demodulator 53 of the frequency modulated signal. According to the example, the demodulation is performed with the pulse detectors 58, 60 in two branches, one of which inverts the signal before detection, and the branches are combined after the detection. The demodulated FM signal is low pass filtered with a filter 54, and an analogue signal AF is thus obtained.

A frequency modulated signal means a modulated signal, which is modulated by influencing the frequency of the carrier wave directly or indirectly. The following modulation methods, for example, are used for frequency modulation. FM (Frequency Modulation), NBFM (Narrow Band Frequency Modulation), PM (Phase Modulation), NBPM (Narrow Band Phase Modulation), FSK (Frequency Shift Keying) and FFSK (Fast Frequency Shift Keying). In phase modulation (PM), the frequency is changed for a moment for changing the phase of the signal.

The implementation of the blocks shown is not explained here in greater detail, because a person skilled in the art will be able to construct a solution according to the invention on the basis of the above description.

The invention is not limited merely to the above examples of application, but many modifications thereof are possible within the scope of the inventive idea defined by the attached claims. It should be especially noted that the invention is applicable in many environments, such as the NMT (Nordic Mobile Telephone) and AMPS (Advanced Mobile Phone System).

What is claimed is:

1. A method for receiving a frequency modulated signal, characterized in that
the radio frequency signal is mixed and summed into a low-frequency signal that includes I and Q components of the radio frequency signal,
the falling and rising edges of said low-frequency, modulated signal are detected,
a second signal is formed on the basis of said edge detection, the frequency of the second signal being twice the frequency of said low-frequency signal, and
said second signal is frequency detected to form an FM demodulated signal.

2. A method according to claim 1, characterized in that the processing of the frequency modulated signal includes the following steps:
the antenna signal is filtered with a band pass filter,
the signal is amplified,
the signal is down-converted in at least two branches with phase-shifted local oscillator signals LO,
the signal is low pass filtered and amplified.

3. A method according to claim 1, characterized in that the processing of the frequency modulated signal also includes the following steps:
the signals are phased in at least two branches,
the signals are summed into one branch,
the signal is low pass filtered,
amplified and
demodulated.

4. A method according to claim 1, characterized in that the demodulation of the frequency modulated signal includes the following steps:
the modulated signal is divided into two branches, the first one for the detection of the rising signal edge and the second one for the detection of the falling signal edge;
the rising edge of the modulated signal is detected in the first branch,
the modulated signal is inverted and the rising edge of the inverted, modulated signal is detected in the second branch, and
the signals processed in the first and the second branch are combined.

5. A method according to claim 1, characterized in that the demodulation of the frequency modulated signal includes the following steps:
the modulated signal is divided into two branches, the first one for the detection of the rising signal edge and the second one for the detection of the falling signal edge,
the rising edge of the modulated signal is detected in the first branch,
the falling edge of the modulated signal is detected in the second branch, and
the signals processed in the first and the second branch are combined.

6. A method according to claim 1, characterized in that pulses of a predetermined length are formed on the basis of said edge detection, and the pulses are summed to form said second signal.

7. An arrangement for receiving a frequency modulated signal, characterized in that it comprises
means for mixing and summing a radio frequency signal into a low-frequency signal that includes I and Q components of the radio frequency signal, and demodulator means, which comprise
means for detecting the falling and rising edges of said low-frequency signal,
means for forming a second signal on the basis of said edge detection, the frequency of the second signal being twice the frequency of said low-frequency signal, and
means for the frequency detection of said second signal to form a an FM demodulated signal.

8. An arrangement according to claim 7, characterized in that it comprises mixers and 0° and 90° phase shifters for mixing the signal of at least two branches with the signal of the local oscillator LO.

9. An arrangement according to claim 7, characterized in that it comprises 0° and 90° phase shifters, an adder and a demodulator of the frequency modulated signal.

10. An arrangement according to claim 7, characterized in that the demodulator of the frequency modulated signal comprises two branches, of which the upper branch comprises a pulse detector for detecting the rising edge of the frequency modulated signal to be demodulated, and the lower branch comprises an inverter and a pulse detector connected in series for detecting the falling edge of the frequency modulated signal to be demodulated, and an adder that combines the branches.

11. An arrangement according to claim 7, characterized in that the demodulator of the frequency modulated signal comprises two branches, of which the upper branch comprises a pulse detector for detecting the rising edge of the frequency modulated signal to be demodulated, and the lower branch comprises a pulse detector active on the falling edge of the signal for detecting the falling edge of the frequency modulated signal to be demodulated, and an adder that combines the branches.

12. An arrangement according to claim 7, characterized in that the means for detecting the edges of a low-frequency signal comprise a pulse generator for forming a pulse of a specified length as triggered by the edge of a low-frequency signal.

13. A mobile station, characterized in that it comprises an arrangement according to claim 7 for receiving a frequency modulated signal.

* * * * *